United States Patent
Cummins et al.

(10) Patent No.: US 11,258,763 B2
(45) Date of Patent: Feb. 22, 2022

(54) COMPUTER NETWORK SECURITY CONFIGURATION VISUALIZATION AND CONTROL SYSTEM

(71) Applicant: CybernetIQ, Inc., Ottawa (CA)

(72) Inventors: Joseph Cummins, Ottawa (CA); Jonathan Wong, Ottawa (CA)

(73) Assignee: CYBERNETIQ, INC., Ottawa (CA)

( * ) Notice: Subject to any disclaimer, the term of this patent is extended or adjusted under 35 U.S.C. 154(b) by 282 days.

(21) Appl. No.: 16/463,582

(22) PCT Filed: Nov. 21, 2017

(86) PCT No.: PCT/CA2017/051389
§ 371 (c)(1),
(2) Date: May 23, 2019

(87) PCT Pub. No.: WO2018/094516
PCT Pub. Date: May 31, 2018

(65) Prior Publication Data
US 2019/0319926 A1    Oct. 17, 2019

Related U.S. Application Data

(60) Provisional application No. 62/426,369, filed on Nov. 25, 2016.

(51) Int. Cl.
*H04L 12/00* (2006.01)
*H04L 29/06* (2006.01)
(Continued)

(52) U.S. Cl.
CPC .......... *H04L 63/0263* (2013.01); *G06F 9/451* (2018.02); *H04L 41/02* (2013.01); *H04L 41/22* (2013.01); *H04L 63/20* (2013.01)

(58) Field of Classification Search
USPC ...................................... 709/201, 223, 224
See application file for complete search history.

(56) References Cited

U.S. PATENT DOCUMENTS 5,910,803 A    6/1999  Grau et al.
6,535,227 B1   3/2003  Fox et al.
(Continued)

FOREIGN PATENT DOCUMENTS

CA        2328012 A1 *  7/2001  ............. H04L 12/26

OTHER PUBLICATIONS

Andress., "The Basics of Information Security: Understanding the Fundamentals of InfoSec in Theory and Practice", 2nd Edition, Jun. 2014, Elsevier: Oxford, 240 pages.
(Continued)

*Primary Examiner* — Frantz Coby (57) ABSTRACT

A computing device is configured to retrieve network security configuration information from a computer network and generate a security configuration map which readily enables a user to detect defects in the security configuration with respect to a security policy. The computing device retrieves firewall configurations from security appliances in the network which operate firewalls, and processes the firewall configurations to generate a set of corresponding standardized firewall configurations. These are processed to identify enclaves containing network nodes which are associated with respective security sensitivity values based on the security policy. The computing device monitors and detects inter-node network traffic. The computing device generates a map representing the network nodes and security appliances, the security enclaves, the respective security sensitivity values, and the network traffic flows, thereby render-
(Continued)

ing readily visible inconsistencies between the actual security configuration and traffic flows, and the security policy.

15 Claims, 5 Drawing Sheets

(51) Int. Cl.
G06F 9/451 (2018.01)
H04L 41/02 (2022.01)
H04L 41/22 (2022.01)

(56) References Cited

U.S. PATENT DOCUMENTS

| | | | |
|---|---|---|---|
| 6,900,822 B2 | 5/2005 | Germain et al. | |
| 7,016,980 B1 | 3/2006 | Mayer et al. | |
| 7,096,502 B1 | 8/2006 | Fox et al. | |
| 7,536,548 B1* | 5/2009 | Batke | H04L 63/061 |
| | | | 713/166 |
| 8,418,246 B2* | 4/2013 | McConnell | H04L 63/107 |
| | | | 726/22 |
| 9,124,636 B1* | 9/2015 | Rathor | H04L 63/1441 |
| 9,185,124 B2* | 11/2015 | Chakraborty | H04L 63/1425 |
| 9,215,244 B2* | 12/2015 | Ayyagari | G06F 9/00 |
| 9,350,622 B2 | 5/2016 | Smith et al. | |
| 9,401,924 B2* | 7/2016 | Ge | H04L 63/1425 |
| 9,438,614 B2* | 9/2016 | Herz | H04L 41/16 |
| 9,781,114 B2* | 10/2017 | Pollutro | G06F 21/6218 |
| 9,853,999 B2* | 12/2017 | Singh | H04L 63/1491 |
| 9,961,099 B2* | 5/2018 | Singh | H04L 63/1425 |
| 10,805,175 B2* | 10/2020 | Stocker | H04L 67/1097 |
| 2003/0097588 A1 | 5/2003 | Fischman et al. | |
| 2005/0021683 A1 | 1/2005 | Newton et al. | |
| 2006/0041936 A1 | 2/2006 | Anderson et al. | |
| 2008/0289027 A1 | 11/2008 | Yariv et al. | |
| 2014/0157405 A1 | 6/2014 | Joll et al. | |
| 2015/0358359 A1* | 12/2015 | Ghai | G06F 21/604 |
| | | | 726/23 |
| 2019/0319926 A1* | 10/2019 | Cummins | H04L 63/0263 |

OTHER PUBLICATIONS

International Patent Application No. PCT/CA2017/051389, International Preliminary Report on Patentability dated Jun. 6, 2019.
International Patent Application No. PCT/CA2017/051389, International Search Report and Written Opinion dated Jan. 25, 2018.

* cited by examiner

COMPUTER NETWORK SECURITY CONFIGURATION VISUALIZATION AND CONTROL SYSTEM

FIELD

The present disclosure relates generally to computer network security configuration visualization and control.

BACKGROUND

Computer network security is an increasingly complex and consequential issue. As progressively more and more sensitive and valuable activity is performed using computers and computer networks—for example, online banking, electronic medical records, confidential communications—the incentive for infiltration and criminal use of such information also grows accordingly. As the complexity of computer networks, and their use, and the diversity of users, increases, so does the difficulty involved in configuring the networks properly and sufficiently to safeguard sensitive information.

To this end, it is now commonplace for computer network managers to formulate network security policies which define the sensitivity of different entities and elements in the computer network. Numerous security policy models are used, including confidentiality models such as the Bell-La Padula model, and integrity models such as the Biba or Clark-Wilson model. In any event, the operational technology of the network is then configured with the intention to give effect to the security policy. For example, if a security policy designates two entities in the network in such a way that communication between them should be prevented, then it is desirable for the configuration of the technology in the network to operate so as to prevent such communication. If the technology permits such communication, then it fails correctly to implement the security policy, and a security weakness exists in the network.

A chronic difficulty, however, is that the complexity of security technology implemented in modern computer networks renders reliable characterization of the total, as well as particulate, security configuration of the network extremely difficult, if not impossible. In other words, it is generally not possible to determine without immense time and effort whether the combination of the configurations of all of the different entities in the network is such that they would together operate consistently with the security policy. In other words, it is often the case that despite diligent effort, the actual configuration of a network does not accurately implement the defined security policy, with the result that access to some sensitive entities is permitted where it should be prevented.

Numerous solutions to this problem have been proposed. Some proposed solutions create a model of the computer network and then analyze the model to determine the security posture of the network. For example, U.S. Pat. No. 7,096,502 teaches a similar solution. One problem with such solutions concerns the complexity of the network and of the analysis required to identify and represent to a user such as a network administration information which is relevant at any given moment, and useful to identify and remedy specific existing defects in the network security configuration, without overwhelming the user with the volume or complexity of information presented.

Some other solutions have attempted to address this problem by providing means to visualize aspects of communication in a network. For example, U.S. Pat. No. 6,900,822 teaches a system and method for visually representing performance and flow analysis of a communication network having devices connected by links. U.S. Pat. No. 9,350,622 teaches a graphical network topology along with a graphical transmission of a transmission path of a network flow involving a particular device in real time.

While these known solutions provide some assistance, there remains a pressing need to provide a solution which conveniently and readily enables a user, such as a network security administrator, to assess the security configuration of a computer network and to detect defects inconsistent with a security policy.

BRIEF DESCRIPTION OF THE DRAWINGS

Embodiments will now be described, by way of example only, with reference to the attached Figures.

DESCRIPTION

In order to provide a means to enable a user, such as a network security administrator, to assess the security configuration of a computer network and to detect defects inconsistent with a security policy, a computing device may be configured to receive firewall configurations from security appliances of the computer network, generate standardized firewall configurations, receive node security sensitivity values based on the network security policy, monitor network traffic, generate a network security configuration based on the received and generated configuration information, and generate a visual representation of the network security configuration which enables the user readily to comprehend the network security configuration and detect defects including specifically instances where the network security configuration does not correctly implement the network security policy.

As used herein, the term "network node", or simply "node", is an electronic device configured to create and communicate information encoded in signals over an electronic or electromagnetic communications channel. Depending on context, a node may include data communication equipment, such as a network modem, hub, bridge, or switch, or may include data terminal equipment such as a personal electronic device (telephone or smartphone handset), a printer, a host computer, such as a router, a workstation, or a server. In some contexts, a node may designate an addressable network interface, such that a single piece of physical network equipment possessing multiple network interfaces may constitute a like number of nodes.

As used herein, the term "computer appliance", or simply "appliance", is a separate and discrete hardware device with integrated software (e.g. firmware) that is designed to provide a specific computing resource. Computer appliances include, but need not be limited to, "storage appliances", "network appliances", and "special-purpose appliances". Storage appliances are appliances which provide mass storage resources for one or more network-attached systems. Network appliances include appliances which provide networking resources including, but not limited to, network routers and "security appliances".

Security appliances generally include appliances designed to protect computer networks from unwanted traffic, and may include: active devices which block or otherwise control network traffic (e.g. firewalls, anti-virus scanning devices, and content filtering devices); passive devices which detect, monitor, and report on network traffic (e.g. intrusion detection appliances, traffic monitoring devices); preventative devices which scan networks and identify potential security problems; and unified threat management ("UTM") appliances which combine more than one of the foregoing resources in a single appliance. Contemporary examples of security appliances include CISCO Systems PIX™ and Adaptive Security Appliance (ASA) firewalls and Cyberoam™ UTM appliances, and Palo Alto PA-7000™ Series Next-Generation™ firewall appliances.

A "network security policy" or "security policy" is a definition of desired constraints on the behaviour of entities in a computer network and may include specifications of the limitations imposed on each entity which are considered to render it secure in view of its intended role. For example, a server or a storage device intended to store or process highly sensitive information may be defined as possessing a higher degree of sensitivity relative to a workstation intended for use to access only information of low sensitivity. Numerous security policy models are useful, including confidentiality models such as the Bell-La Padula model, and integrity models such as the Biba or Clark-Wilson model.

In particular, a security policy may assign to one or more nodes in the computer network a security sensitivity value reflecting a security sensitivity of the node. For example, the security sensitivity values may specify a ranking reflecting desired limitations on the ability of the corresponding network nodes to communicate with one another.

Figure 1:
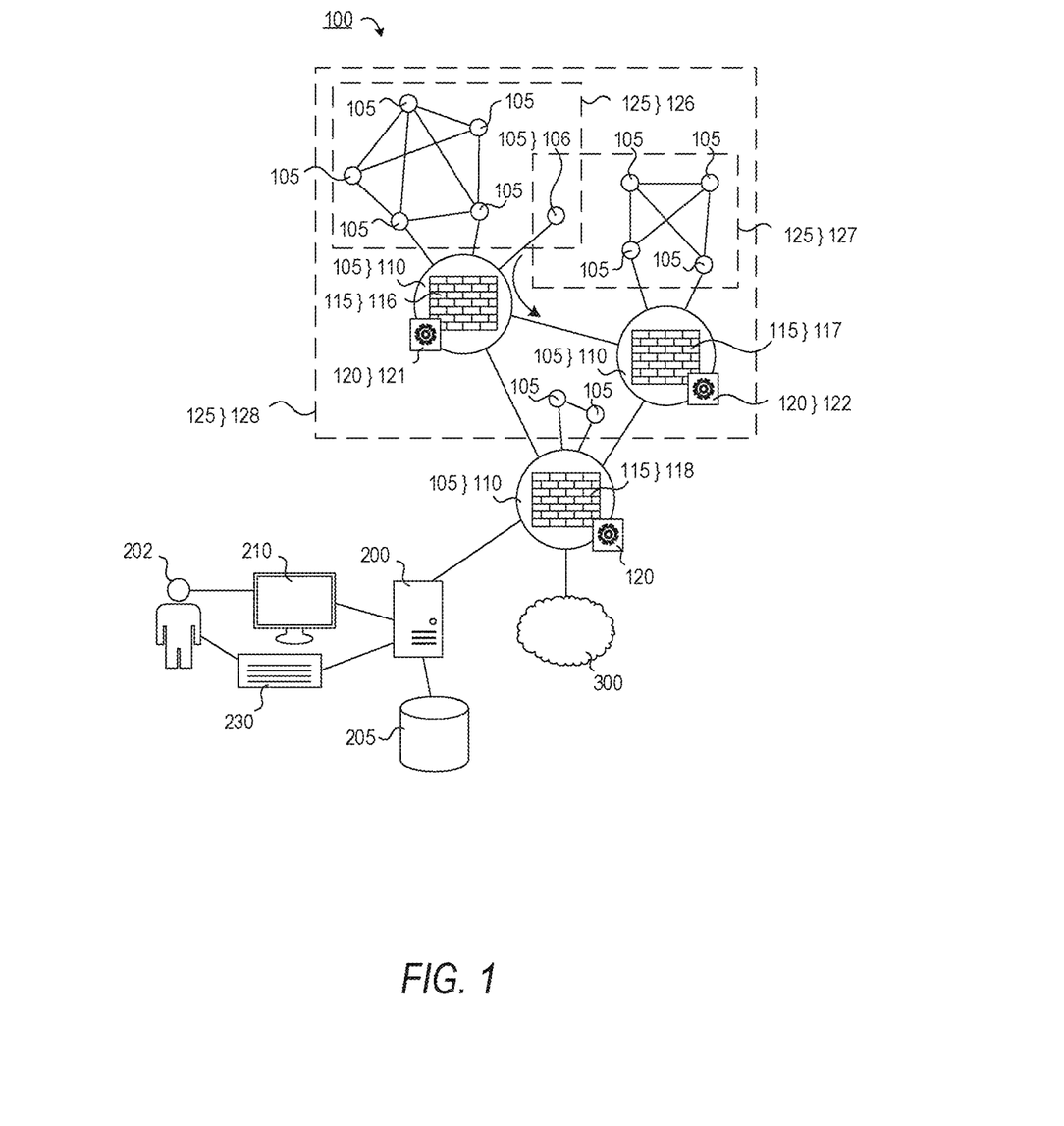
FIG. 1 is schematic diagram of a system of a computer network and a computing device and peripherals configured to assess a security configuration of the computer network and to detect defects inconsistent with a security policy.

With reference to FIG. 1, a computer network 100 may include a plurality of network nodes 105, some of which may be network appliances. The network nodes 105 including the network appliances may be interconnected in any known network configuration including without limitation star topography (master/slave relationship), ring topography, common bus/"flat" topography (each node has an equal priority), mesh topography (semi-interconnected), and fully connected topography. At least some of the network appliances may be security appliances 110, and at least some of the security appliances 110 may operate respective firewalls 115 in accordance with respective firewall configurations 120 specified in corresponding firewall configuration files. More generally, a security appliance 110 may be configured with a security configuration, which may include a firewall configuration when the security appliance 110 operates a firewall 115.

For each security appliance 110 that operates a firewall 115, the corresponding firewall configuration 120 may be of a corresponding firewall configuration type. For example, each firewall configuration 120 may include firewall configuration parameters, and these may be differently represented, or organized, or encoded for each of the different firewall configuration types. In many cases, configuration files may be written in a vendor specific programming language, and configuration files of different types may be written in different programming languages, sometimes dependent upon or proprietary to the original equipment manufacturer (OEM) of the security appliance operating the firewall. This is illustrated in a comparison between CISCO™ firewall syntax and FORTINET™. For example, both use source and destination routing, however one vendor uses "sourceip" and the other uses the shorthand "src-ip". Variations of this sort are widely detailed and have fragmented the industry to require specific certifications and understanding of specific features to be able to use these systems effectively. Where the computer network 100 includes a plurality of security appliances 110 operating firewalls having corresponding firewall configurations 120, the firewall configurations 120 may include a first firewall configuration 121 of a first firewall configuration type, and may also include a second firewall configuration 122 of a second firewall configuration type, and so on.

The computer network 100 may be interconnected hierarchically such that communication of one node 105 with another node 105 in the computer network 100, or outside of the computer network 100, may require mediation by one or more security appliances 110 operating a firewall 115. For example, traffic between the two nodes 105 may require routing by one or more security appliances 110. As such, communication of a node 105 with another internal node 105, or outside of the network 100, may be permitted, blocked, or generally regulated in accordance with the firewall configurations 120 or appropriate policies of the firewalls 115 operated by the intervening security appliances 110. For example, for a given node 105, the firewall configuration 120 of a firewall 115 in a link path from that node 105 to another node 105 may include rule sets that allow or block communication. Such rule sets may be defined based on any relevant parameters including, for example, allowed or blocked Internet protocol (IP) address ranges, network port ranges, network protocols, and media access control (MAC) addresses. Likewise, many advanced network appliances 110 can understand and interrupt attempts at leveraging the system limitations to block attempts at communication, or deny traffic to specific types of Domain Name System (DNS) providers. Further still, "deep packet inspection" firewalls can evaluate the configuration and length of communication for potential implication of malicious communication, or even eliminate attempts at communication using obfuscated or encrypted techniques.

The nodes 105 whose communication with other internal nodes 105 in the network 100, or outside the network 100, is regulated by a common firewall 115 may all be considered to be 'behind' the firewall 115, and by virtue of this relationship may be considered to constitute a "security enclave" 125, or "enclave", inasmuch as the firewall configuration 120 of the common firewall 115 commonly governs communication of the nodes 105 in the enclave 125 with nodes 105 outside of the enclave 125. Such an enclave 125 may also be regarded as a security virtual local area network (VLAN) or network segment implemented through selective configuration of the security appliance firewalls 115.

Such security enclaves 125 may be nested, such as when a first group of nodes 105 are behind a first firewall 116, a second group of nodes 105 are behind a second firewall 117, and both the first and second groups of nodes 105 are behind a third firewall 118. In such case, the first group of nodes 105 may constitute a first enclave 126, the second group of nodes 105 may constitute a second enclave 127, and the first and second groups of nodes 105 may constitute a third enclave 128 containing both the first 126 and second enclaves 127. It is also possible for security enclaves 125 to overlap without nesting, such as when as when a first group of nodes 105 are behind a first firewall 126, a second group of nodes 105 are behind a second firewall 127, and at least one of the nodes 106 of the first and second groups is behind both the first firewall 116 and the second firewall 117. Such redundancy ensures that should a first appliance 110 be compromised or corrupted that other appliances 110 are available to correct, failsafe, or share the responsibility of protection of those sensitive enclaves 125.

One or more of the nodes 105 may also be characterized by a security sensitivity value (not shown). Each of the nodes 105 so characterized may be assigned a corresponding security sensitivity value, and the security sensitivity values may be stored in a data storage 205 which may be accessible by a computing device 200 to assign and store the security sensitivity values, or to retrieve them for display on a display 210, or to modify them. For example, the security sensitivity values may specify a ranking corresponding to a security policy reflecting intended limitations on the ability of the corresponding network nodes to communicate with one another. For example, an assignment of a relatively higher security sensitivity value to a first node and a relatively lower security sensitivity value to a second node may indicate a policy that while the first node is intended to be capable of initiating communication with the second node, the second node is intended to be blocked from initiating communication with the first node. One non-limiting example of security sensitivity values includes Cisco™ ASA Security levels (see, e.g. J. Andress, *The Basics of Information Security: Understanding the Fundamentals of InfoSec in Theory and Practice,* 2nd Edition, (Elsevier: Oxford, 2014)). In accordance with this scheme, a first interface assigned a higher security level is generally permitted to initiate access to a second interface assigned a lower security level, and the second interface is permitted to reply to that access. Access from the second interface to the first interface, however, is generally prohibited or requires an exception to the general policy. Other configurations are possible. These include lower security levels that unidirectionally "push", or transmit without successful acknowledgement, higher security zones that "pull" or access information without authentication or monitoring, and lastly two separate zones that transmit on predefined separate ports in a push configuration that are used to communicate.

Figure 2:
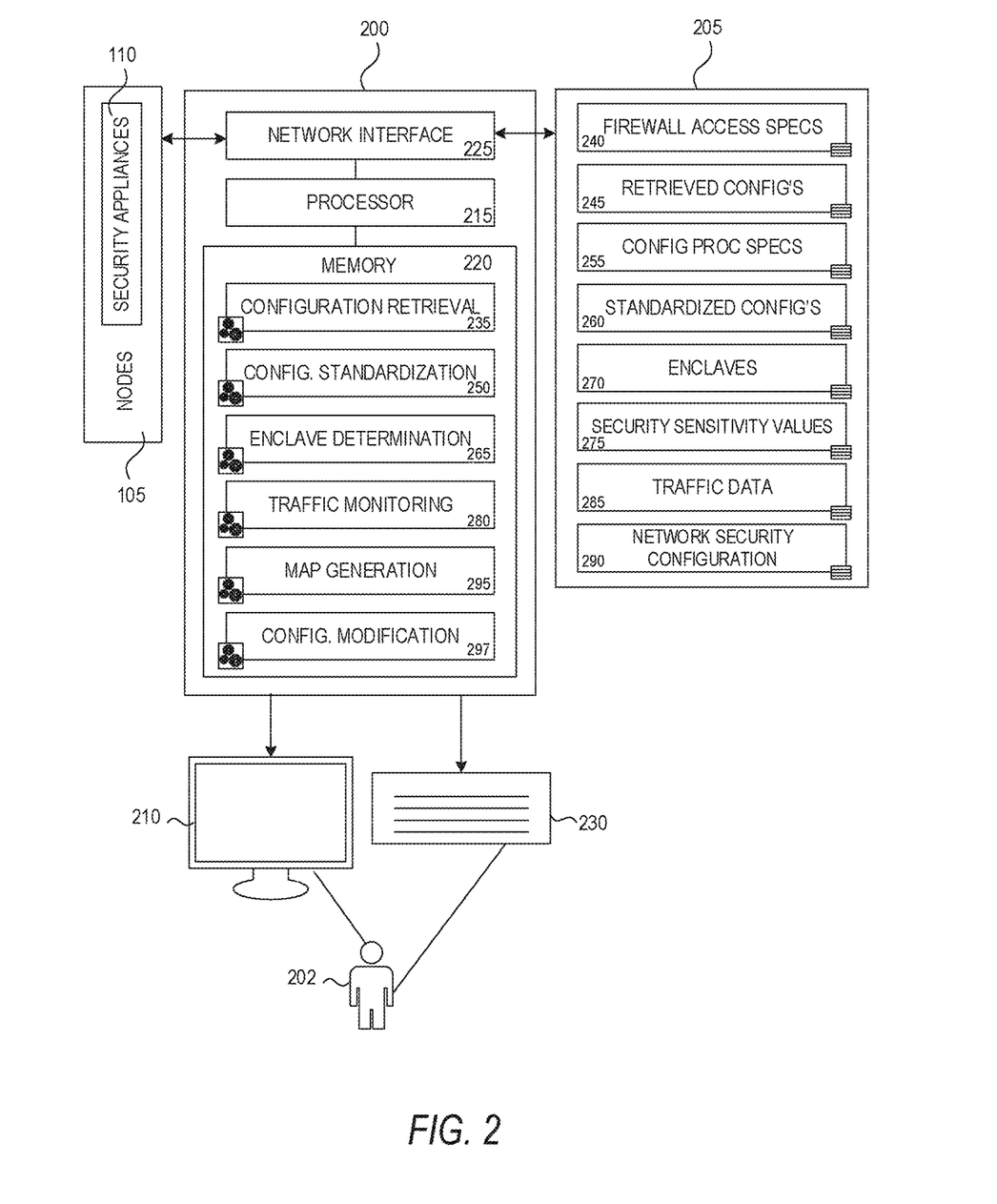
FIG. 2 is a schematic diagram of a configuration of the system of FIG. 1.
Figure 3:
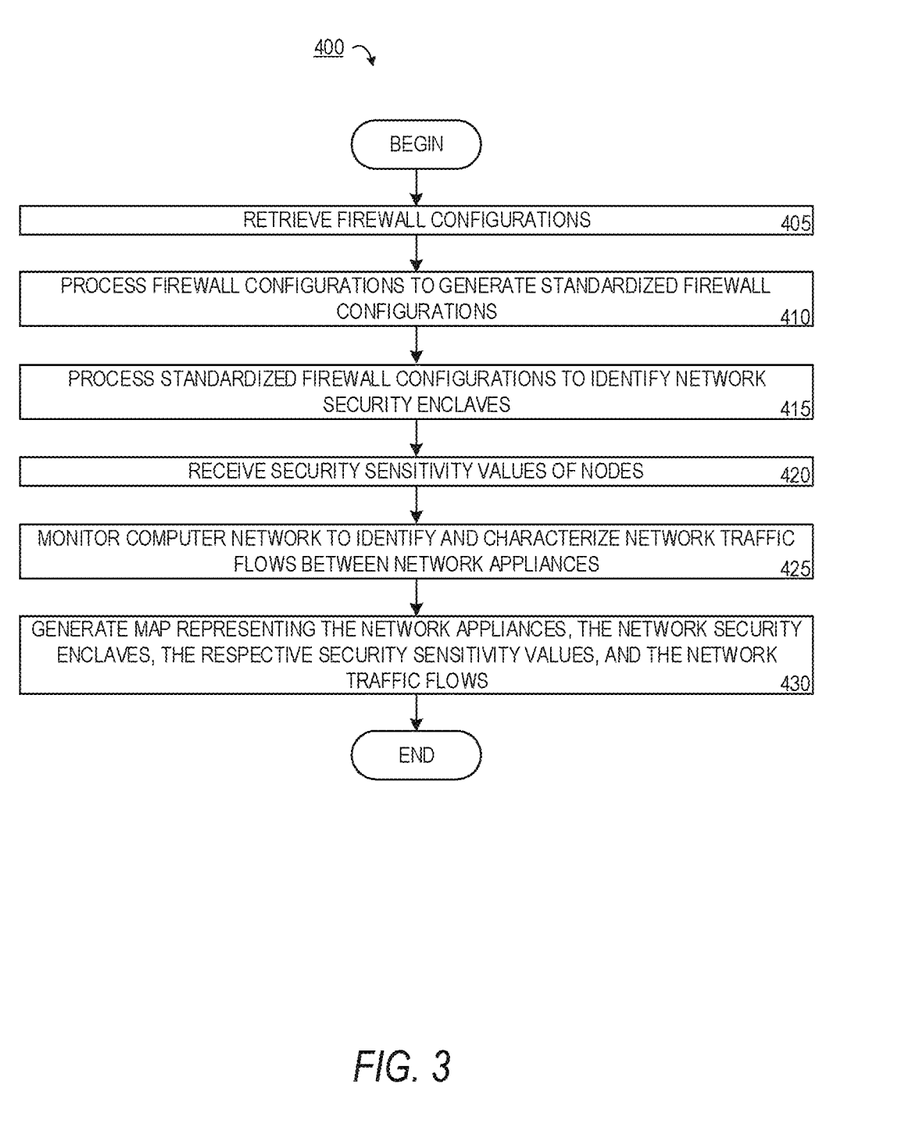
FIG. 3 is a flowchart of a method for assessing the security configuration of the computer network and to detect defects inconsistent with the security policy.

In view of the above network configuration, and with reference to FIG. 2, a computing device 200 may be configured to monitor the computer network 100, and generate a map in a display 210 representing a network security configuration of the computer network 100. A corresponding method 400 is shown in FIG. 3. The computing device 200 may have a processor 215, a memory 220, and a network interface 225, and may include or interface a user interface 230 and a display 210. The memory 220 may store computer-readable instructions executable by the processor 215 to perform the methods and functions described herein. The computing device 200 may include or interface a storage device, which may include a database 205, as described herein. The network interface 225 may be wired or wireless, for interfacing the computer network 100, and may also access another network such as the Internet 300.

In particular, and as shown in FIG. 2, the computing device 200 may be configured with a number of components or modules, each of which is configured to perform certain, specific functions as described herein. Each module may include corresponding computer-readable instructions stored in the memory 220 and executable by the processor 215 to perform the corresponding functions described herein using the network interface 225, user interface 230, display 210, and/or storage device 205. Each module may additionally or alternatively include any desired combination of hardware and software or other means to perform such functions. The computing device 200 may include or interface with the storage device 205 to retrieve or process data as described herein, and as shown in FIG. 2 the storage device 205 may be configured with specific data structures to store each respective category of data.

As discussed above, the computer network 100 may comprise a plurality of network appliances 110 which may also be security appliances configured with an appliance security configuration. Each of the security appliances 110 may be accessed to provide the appliance security configuration of the security appliance. For example, one or more of the security appliances may be accessed by a configuration retrieval module 235, which may include a script, of the computing device 200 over the network interface 225, or by another means. The configuration retrieval module 235 may be configured in parallel with a security scanner to discover hosts and services in the computer network, which may include for example the Nmap scanner available at https://nmap.org. Various security scanners may collect network data from the computer network 100 including for example open ports, IP addresses, network interface controller (NIC) data, service data, common vulnerabilities and exposures (CVE) data, and MAC addresses. The data so collected may be stored by the computing device 200 in the storage device 205 using a specific format for later retrieval. In this manner, the computing device 200 may discover nodes 105, including security appliances 110, in the network. One or more of the appliance security configurations may include a firewall configuration 120. Thus, accessing the network appliances 110 to provide the appliance security configurations may provide a respective plurality of firewall configurations 120.

The different security appliances 110 may include a number of different security appliance types, and may require correspondingly different inputs in order to retrieve the firewall configuration 120 of its corresponding firewall 115. Using a user interface 230, a user 202 may cause the computing device 200 to initiate the method to retrieve configuration files (step 405). Alternatively, the computing device 200 may be configured to perform the method automatically, on a periodic basis, or in response to an automatically detected trigger. The computing device 200 may be connected via a network interface 225 to the computer network 100. The computing device 200 may query, which may be by pinging, nodes 105 on the computing network 100 to detect security appliances 110 operating firewalls 115. The computing device 200 may additionally or alternatively use a security scanner, as described above, to retrieve identification and configuration data from the nodes 105 in the network 110. In any event, the security appliances 110 may respond to such queries or other communications with a message including interpretive data identifying the firewall 115. For example, the message may include identifiers of a manufacturer and/or a type of the firewall 115. The computing device 200 may retrieve the identification by performing an access method based on the identifying information to determine the firewall type, for example by lookup in a database table stored in a memory or a storage device, such as a firewall access specifications data structure 240 in the database 205. The computing device 200 may request credentials from the user 202, who may enter them via the user interface 230. Alternatively, the credentials may be stored in a memory, which may include an encrypted memory, or a data storage, which may include an encrypted data storage, from which the computer device 200 fetches them, which may be the firewall access specifications data structure 240 in the database 205. The computing device 200 may then login to the firewall 115 using the credentials. If the login is successful and the computing device 200 is authenticated by the firewall 115, the computing device 200 may then determine commands for transmission to the firewall 115 to retrieve the firewall configuration 120. The computing device 200 may do this by lookup in a table stored in a memory or storage device based on the firewall type previously determined, which may be the firewall access specifications data structure 240 in the database 205. The computing device 200 may then transmit the commands to the firewall 115 and then receive from the firewall the firewall configuration file 120. The computing device 200 may then receive the retrieved firewall configurations 120 and store them in a memory or storage device, which may be in a retrieved configurations data structure 245 in the database 205.

As discussed above, the different firewall configurations 120 may be characterized by one or more different firewall configuration types. Thus, some of the firewall configurations 121 may be characterized by a first firewall configuration type, other ones of the firewall configurations 122 may be characterized by a second configuration type, and so on. For example, some firewall configurations 120 are encoded in a programming language, sometimes low-level and similar to assembly languages, and which may vendor-specific. Many such firewall configurations 120 are text-based. Examples include plaintext, XML, or other open source and proprietary languages, that use syntax operate commands similar to existing development languages. For example, ASA configurations are typically made in a text file with the file type suffix of .cfg, whereas files used to program and configure PaloAlto and Juniper appliances are formatted in XML with the filename suffix .xml. As a result these two vendor filetypes are not compatible. Furthermore, the different syntax found within each of the firewall configuration files complicates the process of comprehending the specification, as illustrated in Table I, which shows a side-by-side comparison of common commands (http://www.fortiadmin-.com/2013/06/cli-fortigate-and-cisco.html).

TABLE I

| Fortigate | Cisco |
|---|---|
| show full-configuration | show run |
| execute factory-reset | write erase |
| show system interface | show run interface brief |
| diagnose hardware deviceinfo nic | show interface |
| get system status | show version |
| get system arp\|diagnose ip arp list | show arp |
| get router info routing-table all | show ip route |
| diagnose system session list | show ip nat translation |
| diagnose system session clear | clear ip nat translation |
| get router info ospf neighbor | show ip ospf neighbor |
| get router info bgp neighbor | show ip bgp neighbor |
| get router info bgp summary | show ip bgp summary |

As discussed above, such typical characteristics of firewall configuration files greatly complicates the task of analysing individual firewall configuration commands, as well as the firewall configurations 120 of a number of firewalls 115 in a network 100, to determine their collective effect with respect to the accessibility of specific nodes 105.

Thus, the computing device 200 may be configured with a configuration standardization module 250 to receive and to process each one of the firewall configurations 120 to generate a corresponding standardized firewall configuration (step 410). In this way, a plurality of firewall configurations 120 characterized by different firewall configuration types may be processed, or translated, or reconfigured into a common, standardized firewall configuration type. For each one of the firewall configurations 120, the computing device 200 may be configured to determine the corresponding firewall configuration type. For each one of the different firewall configuration types, the computing device 200 may be configured with a corresponding algorithm. For each firewall configuration 120, having determined the firewall configuration type of the firewall configuration 120, the computing device 200 may be configured to process the firewall configuration parameters of the firewall configuration 120 based on the algorithm associated with the corresponding firewall configuration type. For example, the algorithm for each firewall configuration type may be specified in a firewall configuration processing specifications data structure 255 stored in the database 205. In this way, the computing device 200 may be configured to generate a corresponding standardized firewall configuration based on the received firewall configuration 120. And, by doing so in connection with a plurality of different firewall configurations 120 characterized by one or more different firewall configuration types, the computing device 200 may be configured to generate a respective plurality of standardized firewall configurations, which may be stored in a corresponding standardized configuration data structure 260 in the database 205.

In general, the computing device 200 may be configured to receive a firewall configuration file including any appropriate parameters, including for example segment specifications, critical path specifications, allowable protocols, blacklists, and whitelists. The computing device 200 may be configured with a configuration file parser which encodes or which accesses in a memory or storage device configuration file processing rules associated with the firewall configuration type of the configuration file. The computing device 200 may operate the configuration file parser to parse the firewall configuration file and generate any desired configuration parameters including, for example, specifications of interfaces of the firewall, network addresses, static routes, and network policies. In general, the firewall policies may be encoded in the firewall configuration file, and generated in the standardized firewall configuration file syntax, in terms of rules or sets of rules defined in terms of individual, sets, or ranges of internet protocol (IP) addresses, network ports, network protocols, and media access control (MAC) addresses or other appliance specific functions that are called for on that specific device/node/group, etc. as determined by policy. The computing device may be configured with further rules to modify, normalize, format, or otherwise render the parsed parameters into the standardized firewall configuration format. The computing device may then store the parsed and processed firewall configuration parameters in a memory or storage device, such as the database, as a standardized firewall configuration file in association with an identifier of the firewall.

For example, one type of retrieved configuration file is a Cisco™ ASA configuration file which in form is a text file script specifying a set of commands. A non-limiting example of a Cisco™ ASA configuration file is shown below:

route wan1 10.10.12.0 255.255.255.0 193.69.108.161 15

The configuration file defines a route, and contains a destination IP, IP mask and default gateway inline with a category identifier 'route' identifying the configuration as a route.

The firewall configuration file is received by the computing device. A user may define and input via a user interface of the computing device organization and/or physical location criteria for categorization. The computing device may remove whitespace from the file. Based on rules retrieved from a memory or a storage device, the computing device may then parse the configuration file to generate one or more of the following categories of firewall rule parameters: host name; interface; route; object network; object-group network; access group; and access-list. Each of these parameters is a category identifier that defines the firewall rule data format as a tuple. Each one of these categories of parameters may be parsed and processed to generate related standardized configuration parameters. A non-limiting example of an algorithm to generate corresponding standardized configuration parameters from the above ASA configuration file is shown below:

```
ConfigRouterRoute cRoute = new ConfigRouterRoute( );
string[ ] split =
line.Substring(CATEGORY_IDENTIFIER.Length).Split(' ');
if (split.Length >= 4) {
    cRoute.DestIP = split[1];
    cRoute.DestIPMask = split[2];
    cRoute.DefaultGateway = split[3];
    result.Add(cRoute);
}
```

For example, the host name may be saved in the standardized configuration. For each interface, the name, interface type, security level, and IP address may be parsed to generate standardized configuration interface parameters. For each route, the destination IP, destination gateway, and destination IP mask may be parsed to generate standardized configuration routes data. For each object network, the host and subnet parameters may be parsed to generate standardized object network parameters. For each object-group network, the host, object, and network parameters may be parsed to generate standardized configuration object group network parameters. The parsed access group data may be saved as like parameters of the standardized configuration file. For each access list, the object group, IP range, and access group may be parsed to generate the access list parameters of the standardized configuration file. In the event that configuration data for the firewall had been previously stored by a similar or different means, for example by a previous retrieval and generation process as described, or by a different means such as manual input, the computing device may be configured to retrieve the previous configuration file and compare it, which may be a 1:1 parameter-for-parameter comparison, to the standardized configuration file now generated, and log and output any differences for resolution.

Thus, a non-limiting example of a generated standardized configuration based on the above ASA configuration example may be as shown below:

```
JSON format (standardized)
{
    "name":"ExampleConfig",
    "interfaces":
        { "name": "wan1",
          "routes":
            {
                {"destip":"10.10.12.0", "mask":
                "255.255.252.0", "defaultgateway":
                "193.69.108.161"}
            }
        }
}
```

Generally, a configuration file will have the same basic categories, but may differ in how a tuple is ordered or the elements within. For example, in the Fortinet™ configuration format, a route may contain the same IP destination, IP mask and default gateway, but may also include fields for Priority and Distance which must be parsed and used to determine the routing table preferences. Configuration files such as Fortinet™ may also include mark-up language such as HTML changing the parsing tasks. A non-limiting example of a Fortinet™ configuration file is shown below:

```
config router static
    edit 1
        set device "wan1"
        set distance 15
        set dst 10.10.12.0 255.255.252.0
        set gateway 193.69.108.161
```

Generation of corresponding standardized configuration parameters based on the above Fortinet™ configuration may be performed in a substantially similar way as with the Cisco ASA example, taking into account differences in the organization and format of the different configuration types.

It will be understood that the foregoing is intended to represent only an example of the generation of standard firewall configurations based on retrieved firewall configurations of different types. Other approaches and variants are possible based on the principles and techniques described herein.

The computing device 200 may be further configured with an enclave determination module 265 to identify and determine security enclaves 125 in the computer network 100 based at least in part on the standardized firewall configurations (step 415). For example, and as noted above, each enclave 125 may be regarded as a security VLAN, an Electronic Security Perimeter, or network segment, and the computing device 200 may identify each enclave 125 as constituting a group of nodes 105 which is characterized by an identical, or substantially similar, accessibility, inbound and/or outbound, to other nodes 105 in the network 100, and/or external to the network 100. Such determination may be made on the basis of the standardized firewall configurations, including, for example, the rule sets which define accessible IP address ranges, port ranges, protocols, and MAC addresses. The computing device 200 may be configured to store the identity and specifications of each enclave 125 in a memory or storage device, such as in an enclaves data structure 270 in the database 205.

The generation of standardized firewall configurations enables reliable contrast and comparison of the firewall configurations of different security appliances of different types. This further enables the identification of security enclaves as noted above. Without the processing of retrieved firewall configurations to generate standardized firewall configurations, as described above, the task of identifying security enclaves would be impossible, or at least prohibitively time-consuming and costly, and thus these steps solve a crucial problem in cybersecurity.

As discussed above, one or more of the nodes 105 in the computer network may be assigned a security sensitivity value. For example, the security sensitivity values may include Cisco™ ASA Security levels, which in the case of security appliances 110 may be assigned via the "nameif" command. The computing device 200, or a different computing device, may be configured to receive the security sensitivity values via a user interface 230, and may connect a storage device to store records associating each node 105, which may be by means of a node identifier, to the corresponding security sensitivity values. In this way, the computing device 200 may be used to receive and store in the storage device data associating each node 105 with a corresponding security sensitivity value (step 420), such as in a security sensitivity values data structure 275 in the database 205.

The computing device 200 may be further configured with a traffic monitoring module 280 configured to monitor the computer network 100 to identify and characterize network traffic flows between corresponding ones of the nodes 105, including the network appliances 110 (step 425). For example, the computing device 200 may be configured to detect traffic flows between any two nodes 105 in the network, and identify characteristics of the traffic flow. The traffic flow characteristics may include its network protocol, including for example transmission control protocol (TCP), user datagram protocol (UDP), or file transfer protocol (FTP), among others. The characteristics may also include the internet protocol port of either or both of the source and/or destination of the traffic flow. Further characteristics are possible.

The computing device 200 may be configured with any suitable means to monitor the traffic flows. For example, the traffic monitoring module 280, which may include interfaces, may be configured with a packet capture module (PCAP) output which may use a switched port analyzer (SPAN) port interface, which may include for example the libpcap library in Unix-based systems or the WinPcap library in Windows-based systems, and by operation thereof capture network traffic data from the computer network. The network traffic data may include, for example, an organizationally unique identifier (OUI), a media access control (MAC) address, a port number source and destination, and a protocol, associated with the network traffic, Internet Protocol address source and destination, Time To Live (TTL) counter, packet length, priority and payload.

In addition, the computing device 200 may also be configured with a vulnerability scanner (not shown), which may include for example a Nessus™ vulnerability scanner produced by Tenable Network Security of Columbia, Md., United States of America. The vulnerability scanner may collect from the computer network vulnerability information, CVE data, and vulnerability descriptions.

The network traffic data, and optionally also the vulnerability data, collected by such means may be stored by the computing device 200 in a memory or storage device, such as a traffic data structure 285 in the database 205, for later access. This stored aggregate information provides the computing device 200 the ability to identify and quantify the nodes 105 within a specific enclave 125.

By the above methods, the computing device 200 may therefore monitor data traffic in the network 100 and generate and store data representing and characterizing the data traffic.

Thus, as described above, the computing device 200 may be configured to generate and store standardized firewall configurations corresponding to the network appliances 110 operating firewalls 115, to identify and characterize network enclaves 125, to receive and store security sensitivity values of the nodes 105, and to monitor, generate, and store data representing and characterizing data traffic in the computer network 100. The computing device 200 may be configured to store some or all of this information in a data storage as a representation of the security configuration of the computer network 100, such as in a network security configuration data structure 290 in the database 205.

The computing device 200 may be further configured with a map generation module 295 to generate in a display 210 a visual representation of the security configuration of the computer network 100 (step 430). For example, the computing device 200 may be configured to generate a map as follows.

Figure 4:
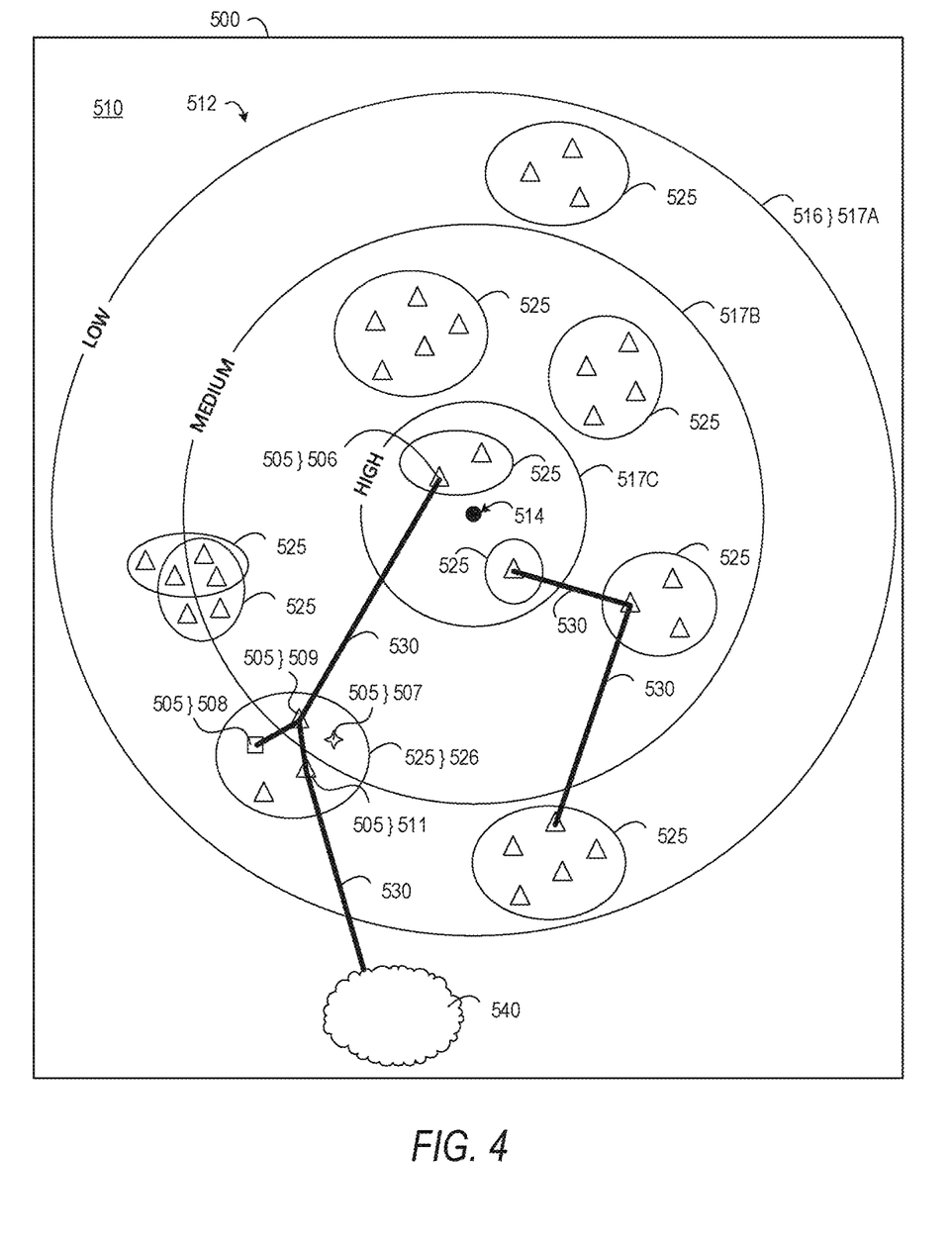
FIG. 4 is a schematic diagram of a map for display by the computing device representing a security configuration of the computer network.

With reference to FIG. 4, the map 500 may include an icon 505 (only sample ones of which are identified in order to avoid obscuring the drawing) representing each node 105, including each network appliance. A visual characteristic of the icon 505, such as its shape, may represent a type of the node 105 represented, or any other relevant selected characteristic of the node 105. For example, a first icon 506 having a first shape, such as a triangle, may signify a node 105 having a first characteristic, while a second icon 507 having a second shape, such as a star, or a third icon 508 having a third shape, such as a square, may respectively signify nodes 105 having second and third different characteristics. In each case, the icon 505 may be positioned in the map 500 based on the security sensitivity value of the corresponding node 105. For example, the map may include a background 510 including a region 512 having a center 514 and an outer perimeter 516. In particular, the map 500 may include a background 510 having a series of concentric perimeters 517A, 517B, 517C, such as circles, which may be similar to the arrangement of a shooting target. The placement of each icon 505 relative to the center 514 and the outer perimeter 516 of the region 512 in the background 510 may be based on the corresponding security sensitivity value. For example, icons 505 of nodes 105 having relatively higher (more sensitive, more restricted) security sensitivity values may be positioned closer to the center 514 of the region 512 relative to icons 505 of nodes 105 having relatively lower security sensitivity values. The concentric perimeters 517A, 517B, 517C may signify and illustrate different ranges of security sensitivity values. For example, icons 505 contained within a first perimeter 517A but outside of a second perimeter 517B may signify nodes 105 having relatively low security sensitivity values, icons 505 contained within the second perimeter 517B but outside of a third perimeter 517C may signify nodes 105 having relatively medium security sensitivity values, and icons 505 contained within the third perimeter 517C may signify nodes 105 having relatively high security sensitivity values. In other words, the icons 505 of nodes 105 having higher security sensitivity values may be closer to the 'bull's-eye' of a concentric, shooting-target background 510, readily illustrating in visual form the respective security sensitivity values of the nodes 105 in the computer network 100. Other arrangements are possible. The use of the concentric ring view provides the user with the ability to visualize key characteristics about a given node, group, or network within the context of the security risk posture. This also is translated into a 'depth' or layered view that can be created by illustrating the outermost layer as the bottom of such a view and the center as the 'top'. Furthermore, the layouts can also be used in an organic creation mode, where the visualizations are created using a "Force-Directed" graph representation and allows the user to create and map the organic nature of the networks without the model adhering to a specific model.

In addition, the map 500 may position the icons 505 corresponding to the nodes 105 in the computer network 100 in order to illustrate network enclaves 125, and may further include graphical representations of walls, or boundaries 525, illustrating those nodes 105 contained within each network enclave 125. For example, the map 500 may be generated such that the icons 505 corresponding to nodes 105 belonging respectively to one or more corresponding network enclaves 125 may be positioned close together, or in other words grouped together, relative to the icons 505 of other nodes 105. In addition, for one or more of the network enclaves 125, the map may be generated to include a visual boundary 525 enclosing the icons 505 of the nodes 105 belonging to the network enclave 125.

In addition, the map 500 may be generated to show one or more of the network traffic flows between corresponding first and second nodes 105 in the network 100, or external to the network 100. For example, for each of one or more of the network traffic flows, the map 500 may include a line 530 joining the icons 505 corresponding to the nodes 105 participating in the traffic flow. The line 530 may have visual characteristics which indicate aspects of the of the network traffic flow. For example, for one of more of the traffic flows, the corresponding line 530 may have a colour indicative of a network protocol of the network traffic flow. Different colours may represent different network protocols. In this way, the map 500 may readily illustrate in visual form network traffic flows as well as the protocols or other aspects of the network traffic flows.

The map 500 may illustrate, at any given time, more than one, or all, of the network traffic flows, in the manner described. Alternatively, the user interface may be interactive and selectively illustrate one or more of the network traffic flows responsive to selections made by a user 202 using the user interface 230. For example, display 210 may be configured to illustrate a particular network traffic flow as described, for example by rendering a coloured lined, when the user 202 selects an icon 505 representing one of the nodes 105 involved in the network traffic flow. Such selection may be performed by any suitable means, and may include using a pointing device of the user interface 230 to move a cursor on, above, or about the icon 505 and wait a pre-determined period—in other words, 'hover' over the icon 505. Alternatively, selection may including using the point device to 'click' on the icon 505. Alternatives are possible.

The generation of a map 500 as described above which graphically represents the security configuration of the computer network 100, including the security sensitivities of the nodes 105, network enclaves 125, and network traffic, enables a user 202, such as a network security administrator, conveniently and readily to assess the overall security configuration of the computer network 100, and additionally to detect defects inconsistent with the security policy. For example, the map 500 as described enables such a user 202 quickly to identify a traffic flow between two nodes 105 with different security sensitivity values, or in different enclaves 125, or otherwise intended not to be capable of accessing each other, but through an unintended combination of the security configurations 120 of different security appliances 110 access is nevertheless technically possible. For example, despite diligent effort, it may be possible for a first node 105, represented by icon 508, characterized by a low security sensitivity to access a second node, represented by icon 506, characterized by a high security sensitivity, contrary to the security policy, by way of access to a third node, represented by icon 509, characterized by a medium security sensitivity which is in the same enclave, represented by boundary 526, as the first node. In a similar way, the map 500 may show that access to the node 105 represented by icon 506 is even possible from an external network 300, such as the Internet, represented by an external network icon 540, via yet another intermediate node 105 represented by icon 511, and the node 105 represented by icon 509 as indicated above. As discussed above, such a result can and often follows from the complexity of firewall configurations, and the computational difficulty of inferring unintended security consequences from the overlapping influences of multiple firewall configurations. The presently disclosed solution, however, sidesteps such difficulties, and instead of attempting to automate completely the task of detecting configuration defects, it instead generates a visual representation of the network security configuration which renders such defects immediately apparent to the eye of a network security administrator of ordinary skill.

Figure 5:
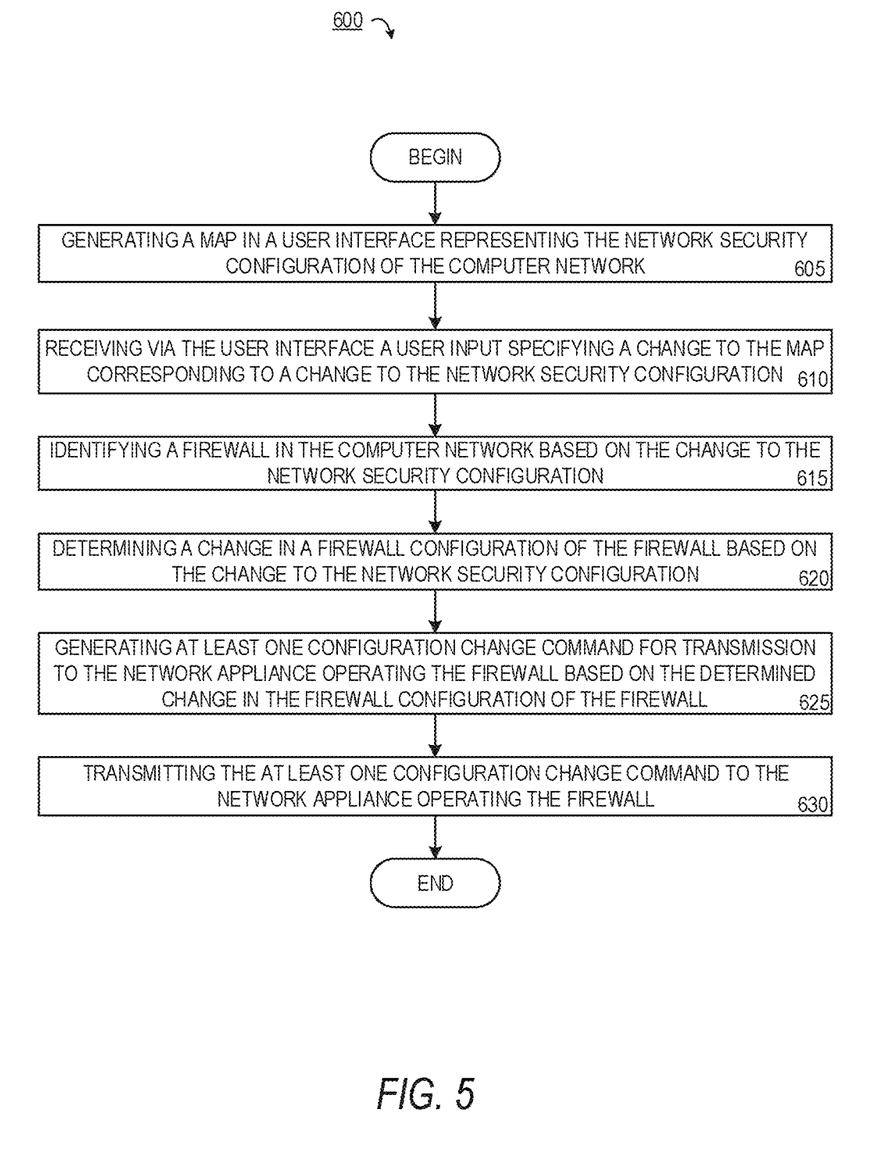
FIG. 5 is a flowchart of a method for modifying a network security configuration of a computer network.

The computing device 200 may also be configured to modify the network security configuration of the computer network 100 comprising the plurality of network appliances 110 based on the generated map 500 in the display 210. A corresponding method 600 is shown in FIG. 5. The computing device 200 generates the map 500 in the display 210 of the user interface 230, which may be by the method 400 described above. The computing device 200 may be configured to receive via the user interface 230 displaying the configuration map 500 using display 210 a user input specifying a change to the map 500 corresponding to a change in the network security configuration (step 610). For example, the computing device 200, and in particular the map generation module 295, may be further configured with or interface a configuration modification module 297 (shown in FIG. 2) to receive, via the user interface 230, inputs which modify displayed elements of the map 500, and based on the modifications determine the particular changes to one or more of the firewall configurations 120 of the security appliances 110 corresponding to the modification.

For example, the computing device 200 may be configured to enable a user 202 to use the user interface 230 to select and move, e.g. drag-and-drop, in the map 500 an icon 505 representing a node 105 from a first location in the map 500 within a visual boundary 525 corresponding to an enclave 125, e.g. a first enclave 126 to a second location in the map 500 outside of the visual boundary 525 of the first enclave 126. The configuration modification module 297 may be configured to determine which firewalls 115 are implicated by the modification (step 615), for example by lookup in the enclaves data structure 270 or the network security configuration data structure 290 to identify one or more firewalls 115 associated with the first enclave 126. The configuration modification module 297 may be further configured to determine the changes in the firewall configurations 120 of those identified firewalls 115 required to correspond to the modification (step 620), for example to delete or modify one or more firewall configuration parameters of the firewall configurations 120 of the identified firewalls 115 so as no longer to limit traffic to or from the node 105.

The configuration modification module 297 may be further configured to implement the changes by formulating the command sets appropriate to each corresponding firewall 115 (step 625) and transmitting the command sets to the corresponding security devices 110 with authentication as required (step 630). For example, for a particular firewall 115 for which the firewall configuration 120 is to be changed responsive to the above-described user input, the intended firewall configuration changes may initially be determined and formulated relative to the standardized firewall configuration of the firewall 115, which may be retrieved from the standardized configuration data structure 260 based on the determined identifier of the firewall 115. The configuration modification module 297 may be further configured to determine a firewall configuration type of the firewall configuration 120 of the firewall 115, which may be by lookup in a data structure in the database 205 which stores an association between an identifier of the firewall 115 and a firewall configuration type, and which may include one or more of the firewall access specifications data structure 240, the retrieved configurations data structure 245, or the network security configuration data structure 290. Having determined the type of the firewall configuration 120, the configuration modification module 297 may be further configured to generate one or more configuration change commands based on the intended firewall configuration changes for the firewall configuration 120 of the firewall 115 and the firewall configuration type of the firewall 115. The computing device 200 may be configured with a corresponding algorithm associated with the firewall configuration type of the firewall configuration 120 operable to generate the one or more configuration change commands based on the intended firewall configuration changes formulated relative to the standardized firewall configuration. A corresponding algorithm for each firewall configuration type may be specified in a data structure in the database 205, which may include the firewall configuration processing specifications data structure 255 stored in the database 205.

Having generated for each firewall 115 identified as implicated by the desired network security configuration change corresponding configuration change commands relative to the firewall configuration type of the firewall configuration 120 of the firewall 115, the computer device 200 may be further configured to transmit the respective configuration change commands to the corresponding firewalls 115 using the network interface 225 based on an access method which may be specified in the database 205, which may include in the firewall access specifications data structure 240 stored in the database 205. The computing device 200 may request credentials from the user 202, who may enter them via the user interface 230. Alternatively, the credentials may be stored in a memory, which may include an encrypted memory, or a data storage, which may include an encrypted data storage, from which the computer device 200 fetches them, which may be the firewall access specifications data structure 240 in the database 205. The computing device 200 may then login to the firewall 115 using the credentials, and transmit the configuration change commands to the firewall 115.

In the above example, the user input specifying the desired change to the network security configuration involved removal of a node 105 from a first enclave 126. The configuration modification module 297 may be further configured to determine and implement network security configuration changes involving the addition or inclusion of a node 105 in an enclave 125, e.g. a second enclave 127, responsive to user input selecting and moving in the map 500 an icon 505 representing the node 105 from a first location in the map 500 outside of, to a second location inside, a visual boundary 525 corresponding to the second enclave 127. Such configuration is substantially the same as the configuration described above, including in that the configuration modification module 297 is configured to determine the changes in the firewall configurations 120 of those identified firewalls 115 required to correspond to the modification, except that such changes, and the resulting generated configuration change commands, add or modify one or more firewall configuration parameters of the firewall configurations 120 of the identified firewalls 115 so as to limit traffic to or from the node 105. The configuration modification module 297 may be configured to perform both kinds of changes, and yet other changes or combinations thereof based on the principles described above.

The foregoing embodiments are intended not to be limiting, but instead illustrative of examples of the application of the principles and techniques of modifying the map 500, which represents the network security configuration, using the user interface 230, and generating and propagating to the security appliances 110 of the computer network 100 the particular changes to the firewall configurations 120 of the security appliances 110 corresponding to the change in the map 500. Other embodiments and variants are possible.

For example, in the above embodiments, the computing device 200 is configured to enable a user 202 to remove or add nodes 105 to enclaves 125 by moving the corresponding icons 505 representing the nodes 105 into and out of the visual boundaries 525 in the map 500 which represent the enclaves 125. Alternatively, or additionally, the computing device 200 may be configured to enable the user 202 using the user interface 230 to modify the visual boundaries 525, while positions of the icons 505 may remain unchanged, so as to change which icons 505 are encompassed by the visual boundary 525—for example, to expand the visual boundary 525 to encompass an additional icon 505, or to contract the visual boundary 525 so as no longer to encompass an icon 505—and in this way to cause the addition or removal of the corresponding node 105 from the corresponding enclave 125.

In general, the computing device 200 may be configured to enable any suitable modification to or manipulation of the map 500 using the user interface 230, and by the principles and procedures described above to cause a corresponding change to the network security configuration. In addition, the user interface 230 may be configured to enable modification of the firewall configurations 120 of specific firewalls 115, including the modification port numbers, protocols, allow/deny, and also to enable modification of the map 500 display, including whether to show traffic flow involving or default gateway of the firewall 115. Other variants are possible.

Having modified the firewall configurations 120 of the implicated firewalls 115, as described above, the traffic routing configurations, e.g. routing tables, of affected upstream and/or downstream traffic routing appliances may be automatically modified in order to route traffic for the node 105 consistently with the modified network security configuration. For example, where the node 105 is added or included in the second enclave 127, one or more upstream and/or downstream traffic routing appliances may be automatically modified in order to route traffic to/from node 105 through the security appliance 110 operating firewall 117 such that firewall 117 is operable to limit traffic to/from the node 105. Similarly, where the node 105 is removed from the first enclave 126, one or more upstream and/or downstream traffic routing appliances may be automatically modified so as no longer to require routing of traffic to/from node 105 through the security appliance 110 operating firewall 116. Updating of the traffic routing configurations of the upstream and/or downstream traffic routing appliances may be performed in any appropriate way, including by means of known communications protocols including, but not limited to, IGRP (Internet Gateway Routing Protocol and BGP (Border Gateway Protocol).

The techniques and principles described herein provide numerous advantages and values over conventional cyber-security solutions. Embodiments of the disclosed inventions enable an understanding of virtual, logical, and physical network deployments formed of existing network appliances. They enable the virtual segmentation and alignment of existing network devices in a clear and comprehensive manner compared to conventional line by line logical snapshots. They enable the discovery and characterization of existing defences present inside a network environment. They enable the highlighting of critical paths—e.g. routes that attackers would break into the system—and critical flows—e.g. paths that insider threats would use to circumvent existing defences. They enable the containment, identification, and control of devices and rogue applications through a simplified interface that can be used to triage events as they occur in real time.

The following are examples of solutions further to the teachings herein.

Example 1

A computer-implemented method of generating a map in a user interface representing a network security configuration of a computer network comprising a plurality of network appliances, the method comprising: receiving a plurality of standardized firewall configurations corresponding respectively to the plurality of network appliances; processing the plurality of standardized firewall configurations to identify network security enclaves; receiving a plurality of security sensitivity values corresponding respectively to the plurality of network appliances; receiving network traffic data identifying and characterizing network traffic flows in the computer network between corresponding ones of the network appliances; and generating in the user interface the map representing graphically the network appliances, the network security enclaves, the respective security sensitivity values, and the network traffic flows.

Example 2

The method according to Example 1, wherein receiving the plurality of standardized firewall configurations corresponding respectively to the plurality of network appliances comprises: accessing each of the network appliances to retrieve an appliance security configuration of the network appliance, the appliance security configuration comprising a firewall configuration, thereby providing a respective plurality of firewall configurations; and processing each of the firewall configurations to generate a corresponding standardized firewall configuration.

Example 3

The method according to Example 2, wherein accessing each of the network appliances to retrieve the appliance security configuration of the network appliance comprises accessing at least one of the network appliances over the computer network to retrieve the appliance security configuration of the network appliance.

Example 4

The method according to Example 2 or 3, wherein first ones of the plurality of firewall configurations are characterized by a first firewall configuration type different from a second firewall configuration type characterizing second ones of the plurality of firewall configurations, and processing each of the firewall configurations to generate the respectively corresponding standardized firewall configurations comprises: determining a firewall configuration type of the firewall configuration, and processing firewall configuration parameters of the firewall configuration based on an algorithm associated with the firewall configuration type to generate corresponding standardized firewall configuration parameters of the corresponding standardized firewall configuration.

Example 5

The method according to Examples 1 to 4, wherein processing the plurality of standardized firewall configurations to identify network security enclaves comprises identifying corresponding groups of the network appliances accessible over the computer network via a corresponding common network appliance.

Example 6

The method according to any one of Examples 1 to 5, wherein receiving the plurality of security sensitivity values corresponding respectively to the plurality of network appliances comprises receiving at least one of the security sensitivity values via the user interface.

Example 7

The method according to any one of Examples 1 to 6, wherein receiving the network traffic data comprises monitoring the computer network to identify and characterize the network traffic flows between the corresponding ones of the network appliances.

Example 8

The method according to any one of Examples 1 to 7 further comprising: retrieving, for each of a plurality of network segments, performing port scanning, vulnerability scanning, passive monitoring, or active packet monitoring to determine security risk values corresponding to at least one of the network appliances; and associating in a memory the security risk values to at least some of the standardized firewall configurations corresponding to the at least one of the network appliances.

Example 9

The method according to any one of Examples 1 to 8, wherein the map comprises a background comprising a region, and, for each network appliance, the map comprises an icon representing the network appliance positioned relatively in the region based on the security sensitivity value of the network appliance.

Example 10

The method according to Example 9, wherein the region comprises a center and a perimeter, and, for each network appliance, the icon representing the network appliance is positioned relative to the center and the perimeter of the region based on the security sensitivity value of the network appliance.

Example 11

The method according to Example 10, wherein icons of network appliances having relatively higher security sensitivity values are positioned closer to the center of the region relative to icons of network appliances having relatively lower security sensitivity values.

Example 12

The method according to any one of Examples 1 to 11, wherein, for each network security enclave, the map comprises a boundary encompassing the icons of the network appliances belonging to that network security enclave.

Example 13

The method according to any one of Examples 1 to 12, wherein, for each network traffic flow, the map comprises a line joining the corresponding ones of the network appliances.

Example 14

The method according to Example 13, wherein a visual attribute of the line joining the corresponding ones of the network appliances represents a protocol of the network traffic flow.

Example 15

The method according to any one of Examples 1 to 14, wherein the user interface comprises a display, and generating in the user interface the map representing graphically the network appliances, the network security enclaves, the respective security sensitivity values, and the network traffic flows comprises displaying the map using the display.

Example 16

A method of modifying a network security configuration of a computer network comprising a plurality of network appliances, the method comprising: generating a map in a user interface representing the network security configuration of the computer network; receiving via the user interface a user input specifying a change to the map corresponding to a change to the network security configuration comprising at least one of: removal of a specified node from a first enclave, and addition of the specified node to a second enclave; identifying a firewall in the computer network based on the change to the network security configuration; determining a change in a firewall configuration of the firewall based on the change to the network security configuration; generating at least one configuration change command for transmission to the network appliance operating the firewall based on the determined change in the firewall configuration of the firewall; and transmitting the at least one configuration change command to the network appliance operating the firewall.

Example 17

The method according to Example 16, wherein the user input modifies a displayed element of the map.

Example 18

The method according to Example 16 or 17, wherein, when the change to the network security configuration comprises removal of the specified node from the first enclave, the user input specifies movement of an icon representing the node from a first location in the map inside a visual boundary corresponding to the first enclave to a second location in the map outside the visual boundary.

Example 19

The method according to any one of Examples 16 to 18, wherein, when the change to the network security configuration comprises addition of the specified node to the second enclave the, the user input specifies movement of an icon representing the node from a first location in the map outside a visual boundary corresponding to the second enclave to a second location in the map inside the visual boundary.

Example 20

The method according to any one of Examples 16 to 19, wherein identifying the firewall in the computer network based on the change to the network security configuration comprises performing a lookup in a data structure identifying an association between the firewall and the first enclave, when the change to the network security configuration comprises removal of the specified node from the first enclave, or the firewall and the second enclave, when the change to the network security configuration comprises addition of the specified node to the second enclave.

Example 21

The method according to any one of Examples 16 to 20, wherein the change in the firewall configuration of the firewall based on the change to the network security configuration comprises deletion or modification of one or more firewall configuration parameters of the firewall configuration so as no longer to limit traffic to or from the node, when the change to the network security configuration comprises removal of the specified node from the first enclave, or so as to limit traffic to or from the node, when the change to the network security configuration comprises addition of the specified node to the second enclave.

Example 22

The method according to any one of Examples 16 to 21, wherein the at least one configuration change command comprises retrieving a standardized firewall configuration of the firewall based on an identifier of the firewall and generating the at least one configuration change command based on the standardized firewall configuration and a retrieved firewall configuration type of the firewall configuration of the firewall.

Example 23

The method according to any one of Examples 16 to 22, wherein the map in the user interface representing the network security configuration of the computer network is generated according to the method of any one of Examples 1 to 15.

Example 24

A computing device comprising a processor, a network interface, and a memory encoding computer-executable instructions executable by the processor to perform the method according to any one of Examples 1 to 23 using the network interface.

Example 25

A non-transient computer-readable medium encoding computer-executable instructions executable by the processor to perform the method according to any one of Examples 1 to 23 using the network interface.

Any examples presented in the description are intended to be non-limiting unless explicitly indicated otherwise.

In the preceding description, for purposes of explanation, numerous details are set forth in order to provide a thorough understanding of the embodiments. It will be apparent to one skilled in the art, however, that these specific details may not be required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Some of the embodiments described herein include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory.

Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

The scope of the claims should not be limited by the particular embodiments set forth herein, but should be construed in a manner consistent with the specification as a whole.

What is claimed is:

1. A computer-implemented method of generating a map in a user interface representing a network security configuration of a computer network comprising a plurality of network appliances, the method comprising:

receiving a plurality of standardized firewall configurations corresponding respectively to the plurality of network appliances;

processing the plurality of standardized firewall configurations to identify network security enclaves;

receiving a plurality of security sensitivity values corresponding respectively to the plurality of network appliances;

receiving network traffic data identifying and characterizing network traffic flows in the computer network between corresponding ones of the network appliances; and generating in the user interface the map representing graphically the network appliances, the network security enclaves, the respective security sensitivity values, and the network traffic flows;

wherein receiving the plurality of standardized firewall configurations corresponding respectively to the plurality of network appliances comprises:

accessing each of the network appliances to retrieve an appliance security configuration of the network appliance, the appliance security configuration comprising a firewall configuration, thereby providing a respective plurality of firewall configurations; and processing each of the firewall configurations to generate a corresponding standardized firewall configuration; and wherein first ones of the plurality of firewall configurations are characterized by a first firewall configuration type different from a second firewall configuration type characterizing second ones of the plurality of firewall configurations, and processing each of the firewall configurations to generate the respectively corresponding standardized firewall configurations comprises:

determining a firewall configuration type of the firewall configuration, and processing firewall configuration parameters of the firewall configuration based on an algorithm associated with the firewall configuration type to generate corresponding standardized firewall configuration parameters of the corresponding standardized firewall configuration.

2. The method according to claim 1, wherein accessing each of the network appliances to retrieve the appliance security configuration of the network appliance comprises accessing at least one of the network appliances over the computer network to retrieve the appliance security configuration of the network appliance.

3. The method according to claim 1, wherein processing the plurality of standardized firewall configurations to identify network security enclaves comprises identifying corresponding groups of the network appliances accessible over the computer network via a corresponding common network appliance.

4. The method according to claim 1, wherein receiving the plurality of security sensitivity values corresponding respectively to the plurality of network appliances comprises receiving at least one of the security sensitivity values via the user interface.

5. The method according to claim 1, wherein receiving the network traffic data comprises monitoring the computer network to identify and characterize the network traffic flows between the corresponding ones of the network appliances.

6. The method according to claim 1 further comprising:

retrieving, for each of a plurality of network segments, performing port scanning, vulnerability scanning, passive monitoring, or active packet monitoring to determine security risk values corresponding to at least one of the network appliances; and associating in a memory the security risk values to at least some of the standardized firewall configurations corresponding to the at least one of the network appliances.

7. The method according to claim 1, wherein the map comprises a background comprising a region, and, for each network appliance, the map comprises an icon representing the network appliance positioned relatively in the region based on the security sensitivity value of the network appliance.

8. The method according to claim 7, wherein the region comprises a center and a perimeter, and, for each network appliance, the icon representing the network appliance is positioned relative to the center and the perimeter of the region based on the security sensitivity value of the network appliance.

9. The method according to claim 8, wherein icons of network appliances having relatively higher security sensitivity values are positioned closer to the center of the region relative to icons of network appliances having relatively lower security sensitivity values.

10. The method according to claim 1, wherein, for each network security enclave, the map comprises a boundary encompassing the icons of the network appliances belonging to that network security enclave.

11. The method according to claim 1, wherein, for each network traffic flow, the map comprises a line joining the corresponding ones of the network appliances.

12. The method according to claim 11, wherein a visual attribute of the line joining the corresponding ones of the network appliances represents a protocol of the network traffic flow.

13. The method according to claim 1, wherein the user interface comprises a display, and generating in the user interface the map representing graphically the network appliances, the network security enclaves, the respective security sensitivity values, and the network traffic flows comprises displaying the map using the display.

14. A computing device comprising a processor, a network interface, and a memory encoding computer-executable instructions executable by the processor to perform the method according to claim 1 using the network interface.

15. A non-transient computer-readable medium encoding computer-executable instructions executable by the processor to perform the method according to claim 1 using the network interface.

* * * * *